Jan. 9, 1962    H. H. ARNOLD    3,015,949
METHOD OF AND APPARATUS FOR VIBRATION TESTING
Filed Jan. 30, 1959
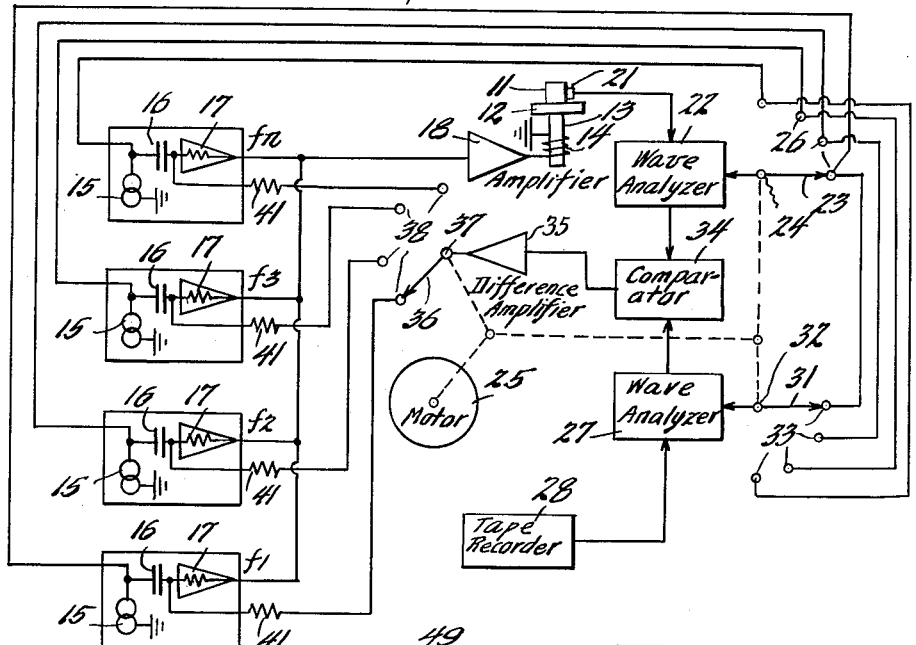
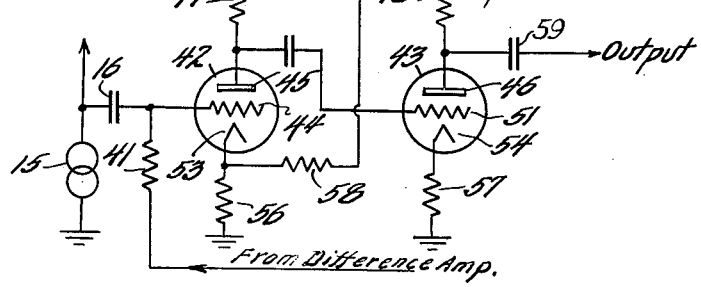
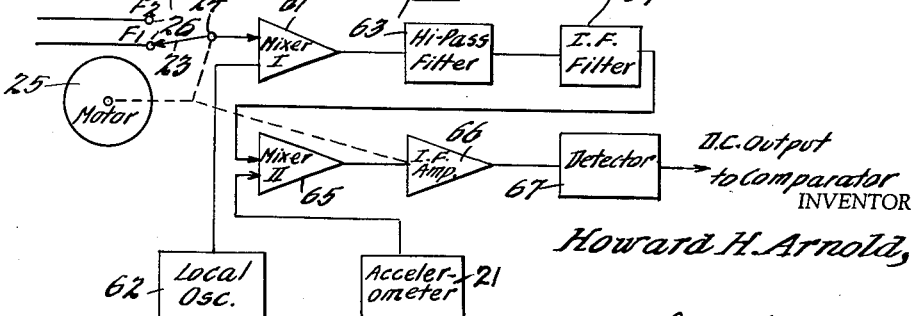
INVENTOR
Howard H. Arnold,
BY
C. B. Hamilton
ATTORNEY 3,015,949
Patented Jan. 9, 1962

3,015,949
METHOD OF AND APPARATUS FOR VIBRATION TESTING
Howard H. Arnold, Winston-Salem, N.C., assignor to Western Electric Company, Incorporated, New York, N.Y., a corporation of New York
Filed Jan. 30, 1959, Ser. No. 790,278
8 Claims. (Cl. 73—71.5)

This invention relates to a method of and apparatus for vibration testing, and more particularly to a method of and apparatus for vibration testing of equipment used in environments of extreme vibration.

When it is desired to test the ability of a particular piece of equipment to withstand mechanical vibrations to be encountered during its use, the established practice is to subject the equipment to sinusoidal vibrations. This sinusoidal vibration is slowly varied over the range of frequencies expected to be encountered during service.

However, as has been determined by field experiments with missile systems, for instance, the vibrational environment encountered by electrical equipment used with a missile during actual service is seldom sinusoidal in character, but to the contrary follows a complex wave shape. Further, the characteristic shape of the vibratory wave form changes throughout the normal flight of a missile or of an aircraft so that not one but several complex wave forms constitute the actual service environment of the equipment used in these or other like carriers.

Accordingly, it is an object of this invention to provide a new and improved method of and apparatus for vibration testing of equipment.

A further object of this invention is to provide a method of and apparatus for producing variable complex mechanical vibrations for testing equipment expected to be exposed to such a varying vibration environment during its service life.

In accordance with the above objects a method is provided for producing mechanical vibration of a preselected wave form and amplitude which comprises the steps of generating an electrical signal of a complex wave form, transforming the electrical signal into mechanical vibration, and maintaining the amplitude of the mechanical vibration equal to the amplitude of the preselected wave form.

In accordance with the above objects, apparatus embodying certain features of this invention may include means for generating an electrical signal, means for transforming the electrical signal into mechanical vibrations, and means for maintaining the amplitude of the mechanical vibration at a preselected value.

Other features and advantages of the invention will become apparent from the following detailed description when taken in conjunction with the accompanying drawings, in which:

FIG. 1 is a schematic of the complex wave vibration system including a specimen positioned for vibration;

FIG. 2 is a diagrammatic view of an amplifier used to amplify the output of each frequency generator shown in FIG. 1; and FIG. 3 is a detailed schematic view of the wave analyzer shown in FIG. 1.

Referring to the drawings and more specifically to FIG. 1, a test specimen 11 is shown mounted on a table 12 of an electrodynamic vibrator 13. Any one of several commercially available electrodynamic vibrators may be used and the operation of such devices is well known in the art and need not be further described. Vibrators suitable for the practice of the invention are described in an article entitled "Producing Motion with Magneto-Strictive and Piezoelectric Transducers," Electrical Manufacturing, December 1955. The wave form of the mechanical vibration of the table 12 and hence the test specimen 11 is determined by the wave form of the voltage impressed across the winding 14. Thus by energizing the winding 14 with a voltage of the desired complex wave shape, a mechanical vibration of a complex wave form identical with that of the voltage will be produced.

By conventional methods, any complex wave form can be resolved into components of individual sinusoidal waves of varying amplitudes and frequencies. Thus, by providing the desired number of sinusoidal frequencies of the proper amplitude, any signal of a complex wave form can be reproduced. As shown in FIG. 1, a plurality of individual generators 15 generate sinusoidal electrical signals of frequencies $F_1, F_2, \ldots F_n$, where "$n$" may be any number as determined by the total of sinusoidal frequencies making up a complex wave form desired to be duplicated. For the purposes of describing a preferred embodiment of this invention a total of 91 frequencies, each spaced approximately 5 percent above the next lower one and covering the range of 30 to 5,000 cycles per second, will be considered, although any number of frequencies covering practically any desired frequency range can be used. It has been found that the frequency range and spacing used in the preferred embodiment of this invention approximates that of a musical scale, and that a tone generator of an electric organ makes a suitable and economical device for this purpose.

The discrete frequency output of each of the individual generators 15 passes through one of a plurality of coupling capacitors 16 to one of the gain control amplifiers 17. After suitable amplification in the gain control amplifiers 17, the discrete frequency signals are coupled together at the input of an amplifier 18. The amplifier 18 may be of any conventional type suitable for driving the electrodynamic vibrator 13, thus it forms no novel feature in this invention. The output of the amplifier 18 energizes the winding 14 of the electrodynamic vibrating machine 13 to drive the table 12 and the test specimen 11 to the required accelerations as determined by the number and frequency of the discrete frequency outputs of the individual generators 15.

An accelerometer 21 suitably mounted on the test specimen 11 picks up the mechanical vibration of the test specimen 11 and converts it into an electrical signal of a frequency corresponding to the mechanical vibration. The operation of accelerometers of the type employed in the instant apparatus is well known generally, and there are several suitable types of accelerometers available commercially, for instance, the Glennite accelerometer, model A–501, manufactured by the Gulton Manufacturing Corporation.

The output of the accelerometer 21 is an electrical signal of the same complex wave form as the mechanical vibration of the test specimen 11 and contains all of the discrete frequencies $F_1, F_2, \ldots F_n$ originally combined to produce the mechanical vibration.

A wave analyzer 22 is connected to and receives the output of the accelerometer 21 while a wiper arm 23 of a stepping switch 24, driven by a motor 25, wipes over a plurality of contacts 26 to connect sequentially the individual frequency generators 15 with the wave analyzer 22. As will be explained more fully hereinafter in reference to FIG. 3, the wave analyzer 22 resolves the output wave of the accelerometer 21 into individual discrete frequencies of varying amplitude, compares the amplitude of each discrete frequency sequentially with the amplitude of an electrical signal of a frequency $F_1, F_2, \ldots F_n$, chosen to equal the discrete frequency, and produces a D.C. voltage proportional to the amplitude of that frequency component of the output of the accelerometer 21 so compared.

A wave analyzer 27 is connected to and receives the output of a tape recorder 28 or other suitable device capable of supplying an electrical signal of a desired complex wave form which is to be duplicated. A wiper arm 31 of a stepping switch 32, driven by the motor 25, wipes over a plurality of contacts 33 and sequentially connects the individual frequency generators 15 with the wave analyzer 27. The wave analyzer 27 resolves the complex wave to be duplicated into discrete frequency components and sequentially compares the amplitude of each component with the amplitude of an identical frequency $F_1$, $F_2$, . . . $F_n$ provided by the generators 15 and produces a D.C. voltage proportional to the amplitude of the frequency component of the complex wave desired to be duplicated.

A comparator 34, connected to the wave analyzers 22 and 27, compares their respective D.C. outputs and produces a D.C. voltage proportional to the difference between their respective outputs. A difference amplifier 35 of conventional design is connected to the comparator 34, and amplifies the difference voltage produced by the comparator 34 to a suitable level. A wiper arm 36 of a stepping switch 37, driven by the motor 25, wipes over a plurality of contacts 38 and sequentially connects the output of the difference amplifier 35 to the coupling capacitors 16 through a plurality of charging resistors 41.

It is to be noted that the switches 24, 32, and 37, FIG. 1, are driven by the same electric motor 25 at a constant rate of speed. Consequently, these switches need not be separated as has been shown for clarity, but can be composed of a simple three-pole multi-position switch. A two-pole switch will suffice in practice as the same contacts can be used both for switches 24 and 32 since they are connected directly to the individual frequency generators 15. Switches of this type are available commercially; for example, a telephone step-by-step selector switch is satisfactory for this purpose.

Referring to FIG. 2, the controlled amplifiers 17 used to amplify the output of each of the individual frequency generators 15 are shown as two-stage resistance-capacitance coupled vacuum tube amplifiers. Each of the controlled amplifiers 17 is composed of two tubes 42 and 43. A grid 44 of the first tube 42 of the controlled amplifier 17 receives the output signal of one of the generators 15 through one of the coupling capacitors 16. The charging resistors 41 are each connected to a grid 44 and allow capacitors 16 to be charged by the output voltage of the difference amplifier 35. Any leakage resistance from grid 44 to ground is large enough to furnish a high resistance leakage path to the capacitor 16 when there is no signal on the grid 44. This maintains the charge placed on the capacitor 16 by the difference amplifier 35 and consequently the proper bias on the grid 44. Plates 45 and 46 are interconnected through load resistors 47 and 48 by means of a conductor 49, while a portion of the output of the tube 42 is applied to a grid 51 of the tube 43 through a coupling capacitor 52. Cathodes 53 and 54 of the tubes 42 and 43, respectively, are connected to ground through suitable resistors 56 and 57. The cathode 53 of the tube 42 is biased by a resistor 58 connected to the output of the tube 42 and the output of the tube 43 is connected to the amplifier 18 through a coupling capacitor 59. The plate and filament circuits of the tubes 42 and 43 are powered by suitable voltage sources, not shown. Obviously, this invention need not be restricted to the use of the particular controlled amplifier described, but may include any type of controlled amplifier which produces the necessary gain.

Referring to FIG. 3, a description of the wave analyzer 22, shown schematically in FIG. 1, will be given. The wave analyzers 22 and 27 are identical in structure and operation except that their respective output voltages are of opposite polarity. Accordingly, only one of the wave analyzers 22 will be described in detail. As shown, a mixer 61 is connected to a local oscillator 62 and to the wiper arm 23 of the stepping switch 24. As previously described, the wiper arm 23 of the stepping switch 24 is driven by the motor 25 and wipes over contacts 26 to connect sequentially the frequency outputs $F_1$, $F_2$, . . . $F_n$ of the individual generators 15 to the wave analyzer 22. The operation of the mixer 61 is conventional, as explained, for example, by Seely, Electron-Tube Circuits, 1950, and by F. E. Ferman, Electronic and Radio Engineering, 4th edition, 1955, pages 573–575. As is well known, two frequencies, such as the frequency ($F_{if}$) of the local oscillator 62 and the frequency ($F_{1-n}$) of the output of one of the generators 15, when mixed, provide a signal which includes in addition to the original frequencies ($F_{1-n}$ and $F_{if}$), the sum and differenec of said frequencies. A high-pass filter 63 and an I.F. filter 64 of a conventional design are connected to the mixer 61 and eliminate all frequencies in the output signal of the mixer 61 except the sum of the frequencies ($F_{1-n}+F_{if}$) before it is received by a second mixer 65.

The second mixer 65 is identical in operation with that of the mixer 61 and mixes the output signal ($F_{1-n}+F_{if}$) of the I.F. filter 64 with the output signal ($F_A$) of the accelerometer 21 which is connected to the mixer 65. The output signal ($F_A$) of the accelerometer 21 includes all of the frequencies $F_1$, $F_2$, . . . $F_n$. By reason of the mixing operation, a signal ($F_{if}$) will be produced which is proportional to the amplitude of a component of the accelerometer output signal corresponding to the frequency ($F_{1-n}$) selected by the position of the stepping switch 24. A narrow band I.F. amplifier 66, tuned sharply to a frequency ($F_{if}$), eliminates all frequencies except a frequency ($F_{if}$) in the output signal of the mixer 65. A detector 67 receives and converts the output of the I.F. amplifier 66 to a D.C. voltage of a magnitude proportional to the amplitude of one of the frequency components ($F_{1-n}$) generated by one of the generators 15 and the amplitude of an identical frequency component contained in the mechanical vibration of the test specimen 11 which component is picked up and contained in the output of the accelerometer 21.

The operation of the wave analyzer 22 is as follows. Assuming the local oscillator 62 provides an I.F. frequency of 50 kc. and the wiper arm 23 of the stepping switch 24 is positioned on a contact 26 so as to connect a generator 15 whose output signal is of a frequency of 1 kc. to the mixer 61, the output of the mixer 61 is:

(1) $F_{if}=50$ kc.
(2) $F_{1-n}=1$ kc.
(2) $F_{if}-F_{1-n}=49$ kc.
(4) $F_{if}+F_{1-n}=51$ kc.

As stated, the high-pass filter 63 and the I.F. filter 64 eliminate the above frequencies (1) through (3) and accepts only the sum frequency (4).

The 51 kc. signal is then mixed in the mixer 65 with the output signal of the accelerometer 21. As previously stated, this signal contains all of the frequencies ($F_{1-n}$) produced by the generators 15. Assuming that the output ($F_A$) of the accelerometer 21 contains only the frequencies of 1 kc. and 1.3 kc., the output of mixer 65 will be as follows:

(1) $F_{if}+F_{1-n}=51$ kc.
(2) $F_A=1.3$ kc.
(3) $F_A=1$ kc.
(4) $F_{if}+F_{1-n}+F_A=52.3$ kc.
(5) $F_{if}+F_{1-n}+F_A=52$ kc.
(6) $F_{if}+F_{1-n}-F_A=49.7$ kc.
(7) $F_{if}+F_{1-n}-F_A=50$ kc.

It is obvious that the narrow band amplifier 66, tuned sharply to 50 kc., will respond to frequency (7) above, i.e., 50 kc., but will reject all others. This output will be proportional to the amplitude of the 1 kc. signal in the output of the accelerometer 21 and will be unaffected by all other frequency components. The detector 67 then converts the output of the narrow band amplifier 66 into a D.C. voltage. It should be noted that the bandwidth of the narrow band amplifier 66 can be varied in synchronism with the setting of the stepping switch 24 by means of the motor 25. A number of possible methods of varying the bandpass of the narrow band amplifier 66 in synchronism with the stepping switch 24 are available. The method involved in the operation of an analyzer identified as Hewlett-Packard model 300A, manufactured by the Hewlett-Packard Corporation, affords satisfactory results.

The detector 67 used to convert the output of the narrow band amplifier 66 may be one of a variety of types and will not be described in detail. A preferred type is a single silicon or germanium diode followed by an R.C. filter. It has been found that a WE-type 400A detector manufactured by the Western Electric Company is satisfactory. In operation the detector 67 produces a D.C. voltage proportional to the peak voltage of the A.C. signal present at the output of the narrow band amplifier 66.

As previously stated, the operation of each of the wave analyzers 22 and 27 is identical. The wave analyzer 22 resolves the mechanical vibration into discrete frequencies ($F_{1-n}$) while the wave analyzer 27 resolves the complex wave to be duplicated into an identical number of frequencies ($F_{1-n}$). Referring again to FIG. 1, the D.C. output voltage of the wave analyzer 27 is reversed in polarity to that of the wave analyzer 22 and is of a magnitude which is proportional to the amplitude of the frequency component ($F_{1-n}$) of the signal to be duplicated which is supplied by the tape recorder 28.

*Operation*

Assuming it is desired to vibrate a test specimen 11 in response to a complex wave form which is expected to be encountered by the test specimen 11 during its service life, and also assuming it is desired to vary the complex wave form of the vibration during the testing operation, it is first necessary to provide a signal source capable of producing an electrical signal which is of the desired complex wave form and which extends over the desired frequency range, in this case 30 to 5,000 cycles per second. This signal may be taped and reproduced by suitable means such as the tape recorder 28. The complex wave can be resolved into 91 discrete frequency components of varying amplitudes. Each one of the 91 discrete frequency components is reproduced by one of the generators 15.

The test specimen 11 is secured to the table 12 of the electrodynamic vibrator 13 and the accelerometer 21 is attached to the test specimen 11. At the beginning of the testing operation the cathodes 53 of the tubes 42 in all of the controlled amplifiers 17 are biased so that with a zero D.C. input potential on the grid 44 of the tube 42, the A.C. output voltage of the controlled amplifiers 17 will be zero or very low. Thus there will be no input to the common amplifier 18 and there will be no vibration produced. The switches 24, 32, and 37 are set to connect an electric signal of the frequency ($F_1$) to the wave analyzers 22 and 27.

Upon the application of a wave to be duplicated to the wave analyzer 27, a positive D.C. output will be produced and transferred to the comparator 34 which is proportional to the amplitude of the particular frequency component ($F_1$) of the wave to be duplicated, and which corresponds to the setting of the stepping switch 32. As there is no D.C. voltage being transferred to the comparator 34 from the wave analyzer 22, there being no output from the accelerometer 21, the output of the comparator 34 becomes positive an amount equal to the D.C. voltage transferred to it from the wave analyzer 27. The difference amplifier 35 amplifies the positive voltage output of the comparator 34 and by means of the stepping switch 37 starts to charge the coupling capacitors 16 through the charging resistors 41 associated with the one generator 15 which produces the frequency ($F_1$). The coupling capacitor 16 will then begin to charge toward a potential equal to the output of the difference amplifier 35. During this period of charging the bias on the grid 44 of tube 42 increases causing the gain of tube 42 to increase. This in turn energizes the electrodynamic vibrator 13 and produces an acceleration at frequency ($F_1$). The accelerometer 21 picks up the acceleration of the test specimen 11 and applies it to the wave analyzer 22. The wave analyzer 22 now begins to produce a D.C. voltage output proportional in amplitude to the vibration frequency ($F_1$) which is applied to the comparator 34. Since the polarity of the D.C. output voltages of the respective wave analyzers 22 and 27 are opposing, the output of the comparator 34 becomes less positive. As the amplitude of the frequency component ($F_1$) of the output of the accelerometer 21 approaches the amplitude of the corresponding component ($F_1$) in the complex wave form to be duplicated, the system reaches equilibrium. The amplitude of the frequency ($F_1$) of the output signal ($F_A$) of the accelerometer 21 approximates the frequency component ($F_1$) of the wave to be duplicated, which is supplied by the tape recorder 28.

It should be noted that this is the normal operation since the amplitude of the frequency component ($F_1$) in the output signal of the accelerometer 21 is generally less than the amplitude of the frequency component ($F_1$) in the complex signal being duplicated. Consequently, the output of the comparator 34 and the difference amplifier 35 is normally a positive D.C. voltage. This positive output charges the coupling capacitor 16 through the charging resistor 41 to raise the bias of the tube 42 and tends to make the output of the difference amplifier 35 less positive. However, if the D.C. output of wave analyzer 22 is greater than that of the wave analyzer 27, the output of the comparator 34 becomes negative, causing the difference amplifier 35 to apply a negative step of voltage to the charging resistor 41. This in turn reduces the output of the controlled amplifier 17 until the respective outputs of the wave analyzers 22 and 27 substantially are equal.

As the motor 25 sequentially steps the switches 24, 32, and 37 to each of the frequency positions ($F_1$) through ($F_n$), the output of each of the controlled amplifiers 17 will be set to produce an electrical signal of the correct amplitude to produce an acceleration of the test specimen 11 approximately equal to that of the complex wave to be duplicated.

A satisfactory dwell time for the switches 24, 32, and 37 at each frequency position ($F_1$) through ($F_n$) is approximately one-tenth of a second if the lowest frequency used is 30 cycles per second. Using a total of 91 frequency positions, this represents a total time of approximately 10 seconds to cover the frequency range from 30 to 5,000 cycles per second in 5 percent steps, allotting equal time to each frequency.

It is not intended to limit this invention to the particular operation herein described. The dwell time of the switches 24, 32, and 37 can be varied by adjusting the speed of the motor 25, for example. The coupling capacitor 16 is made sufficiently large to maintain the proper bias on the tubes 42 and 43 of the controlled amplifiers 17, and the leakage resistance from the grid of tube 42 to ground offers a high resistance leakage path to the charge on the coupling capacitors 16 to maintain the proper bias on the tubes 42 and 43 during periods of inoperation. Since the discharge of the coupling capacitors 16 is very slow, the gain of each of the controlled amplifiers 17 remains constant until reset by the next operation of the switches 24, 32, and 37. The value of charging resistors 41 are selected so that the charging time for capacitor 16 is small compared to the dwell time.

In this fashion the system herein described as a preferred embodiment of the invention quickly responds and reproduces the complex signal provided by the tape recorder 28 or other source and transforms it into mechanical vibration. The motor 25 continuously steps the switches through the frequency position ($F_1$) through ($F_n$) to maintain the mechanical vibration at the desired level. As the wave form of the signal provided by the tape recorder 28 varies, the system will respond quickly to duplicate it, thus vibrating the test specimen 11 in response to a continuously variable combination of frequency components falling within the frequency range of 30 to 5,000 cycles per second. Of course, the frequency range of the system may be other than that of the range described herein.

It is to be understood that the above described arrangement is simply illustrative of the application of the principles of the invention. For instance, this invention need not be limited to the sequential frequency-by-frequency form of wave analysis and reproduction as described, but also may operate on a simultaneous basis as well by providing a single wave analyzer for each discrete frequency component contained in the complex wave desired to be duplicated. Numerous other arrangements may be readily devised by those skilled in the art which will embody the principles of the invention and fall within the spirit and scope thereof.

What is claimed is:

1. A material testing device for vibrating a test piece in response to a signal of a preselected complex wave form which comprises means for generating a signal of a complex wave form composed of a plurality of sinusoidal frequency components, electromechanical vibrator means for vibrating the test piece in response to said signal of complex wave form, a first means connected to said vibration means for sequentially isolating and measuring the amplitude of the individual frequency components of the mechanical vibration produced by said signal, a second means for sequentially isolating and measuring the amplitude of identical frequency components of a signal of a preselected complex wave form composed of the same frequency components as the mechanical vibration produced by the vibrator means, means interconnecting said first and second isolating and measuring means for comparing the amplitudes of the frequency components of the same frequency thus measured, and means responsive to the difference in said amplitudes for adjusting the amplitudes of the frequency components of the mechanical vibration to equal the amplitudes of the identical frequency components of the preselected signal.

2. A material testing device for producing mechanical vibration of a desired complex wave form which comprises means for generating a plurality of discrete frequency components, means connected to said generating means for combining and amplifying said frequency components to produce a signal of a complex wave form, vibrator means energized by said last-mentioned means for producing mechanical vibrations responsive to said signal, a first means connected to said vibrator means for sequentially isolating and measuring the amplitude of each discrete frequency component of the mechanical vibration, a source for providing a signal of the desired complex wave form containing the same frequency components as the mechanical vibrations, a second means connected to said source for sequentially isolating and measuring the amplitude of the discrete frequency components in a signal of the desired complex wave form, comparator means interconnecting said first and second means for comparing the outputs thereof, and means responsive to the output of the comparator means for adjusting the amplitude of the discrete frequency components of the mechanical vibration to equal the amplitude of the corresponding frequency components in the complex wave to be duplicated.

3. A material testing device for vibrating a test piece in response to a signal of a preselected complex wave form which comprises generator means for producing a signal of a complex wave form composed of a plurality of discrete frequency components of different amplitudes, vibrator means connected to said generator means for transforming said signal into mechanical vibration, means connected to said vibrator means for supporting the test piece to be vibrated, a first means responsive to said vibrator means for sequentially isolating and measuring the amplitude of each of the discrete frequency components of the mechanical vibration produced by said vibrator means, means for generating a signal of a preselected complex wave form composed of the same frequency components as the mechanical vibration produced by the vibrator means, a second means responsive to said generating means for sequentially isolating and measuring the amplitude of each of the discrete frequency components of said signal, means interconnecting said first and second isolating and measuring means for comparing the amplitudes of the frequency components of the same frequency thus measured, means responsive to the difference in said amplitudes for adjusting the amplitudes of the frequency components of the mechanical vibration to equal the amplitudes of the frequency components of the same frequency of the signal of the preselected wave form, and means connected to said adjusting means for maintaining said amplitudes substantially equal during the interval between adjustments of the amplitude of each respective frequency component of the mechanical vibration.

4. A material testing device for producing mechanical vibration of a desired complex wave form which comprises a plurality of generators for generating a plurality of signals each of a discrete frequency, a controlled amplifier connected to each generator for amplifying the output of each generator, means connected to said controlled amplifiers for combining and amplifying the outputs of said controlled amplifiers to produce a signal of a complex wave form, vibrator means connected to and energized by said combining and amplifying means for producing mechanical vibrations responsive to said signal, a first means connected to said vibrator means for sequentially isolating and measuring the amplitude of each frequency component of the mechanical vibration, a source for providing a signal of the desired complex wave form composed of frequency components corresponding to the frequency components of the mechanical vibration, a second means connected to said source for sequentially isolating and measuring the amplitude of each of the frequency components of a signal of the desired complex wave form, comparator means interconnecting said first and second isolating and measuring means for producing a voltage output proportional to the difference in the output of the first and the second means, and means responsive to the output of the comparator means for adjusting the amplitude of the frequency component of the mechanical vibration to equal the amplitude of the identical frequency component in the complex wave to be duplicated.

5. Apparatus for producing levels of mechanical vibration within a vibration spectrum constituting a duplication of a signal of a complex wave form, which comprises means for generating a signal of a complex wave form, vibrator means connected to said generating means for transforming said signal into mechanical vibration, a first wave analyzer connected to said vibrator means and to said generating means for resolving the mechanical vibration into discrete frequency components and for sequentially measuring the amplitude of each of said frequency components, a signal source for providing a signal of the complex wave form to be duplicated, a second wave analyzer connected to said generating means and to said signal source for resolving the signal to be duplicated into the identical frequency components as those contained in the mechanical vibration and for sequentially measuring the amplitude of each of said frequency components, a comparator means connected to said first and second wave analyzers for producing a voltage output proportional to the difference in the amplitudes of identical frequency components measured by said wave analyzers, and means responsive to the output voltage of the comparator means for adjusting the amplitude of each of the discrete frequency components of the mechanical vibration to equal the amplitude of the identical frequency component in the signal to be duplicated.

6. A mechanical testing system for producing mechanical vibrations of a desired complex wave form which comprises first generators for generating a plurality of discrete frequencies; means connected to said first generators for combining said discrete frequencies to produce a signal of complex wave form; means responsive to said complex signal for vibrating a test piece; a first means connected to said vibrating means for resolving the complex mechanical wave vibrations produced by said vibrating means into discrete frequency components and for measuring the amplitude thereof; a second generating means for generating a predetermined complex wave signal having frequency components corresponding to the discrete frequency components of said mechanical vibration; a second means connected to said second generating means for resolving said predetermined complex signal into discrete frequency components and for measuring the amplitude thereof; means interconnecting said first resolving means, second resolving means, and said first generators for sequentially rendering said system effective to analyze said discrete frequencies for predetermined time periods; means interconnecting said first and second resolving means for comparing the amplitude of the discrete frequencies from said vibrating means with the amplitude of the discrete frequencies from said second generating means; and means responsive to the difference between said amplitudes for accordingly varying the amplitudes of the discrete frequencies produced by said first generators.

7. Apparatus for producing mechanical vibrations of a predetermined amplitude in accordance with a preselected generated waveform which comprises an electrical coil positioned adjacent a test piece, an alternating current source for energizing the coil to mechanically vibrate the test piece, means responsive to the vibrations of said test piece for generating an electrical waveform composed of discrete frequencies, a first analyzer connected to said generating means for separating the discrete frequencies of said waveform and for measuring the amplitude of the discrete frequencies, a second analyzer for separating and measuring the amplitude of individual frequencies of said preselected waveform, means interconnecting said first and second analyzers for comparing the amplitudes of the individual and discrete frequency components, and means responsive to the amplitude difference between said discrete and individual frequency components for varying the current energizing said coil to vary the amplitude of said mechanical vibrations.

8. A material testing device for vibrating a test piece in response to a signal of a preselected waveform which comprises means for generating a signal of complex waveform, means responsive to the amplitude variations of said complex signal for mechanically vibrating a test piece, a first means responsive to said vibrations for isolating and electrically measuring the amplitude of discrete frequency components of the mechanical vibration produced by said complex wave, means for generating said preselected waveform, a second means for isolating and measuring the amplitude of individual frequency components of the preselected waveform, means interconnecting said first and second measuring means for comparing the relative amplitude difference between said discrete and individual frequency components and, means responsive to said amplitude difference for regulating said complex wave generating means to vary the amplitude of said complex signal.

References Cited in the file of this patent
UNITED STATES PATENTS

| | | |
|---|---|---|
| 1,948,169 | Ermeeff | Feb. 20, 1934 |
| 2,675,698 | Johnson | Apr. 20, 1954 |

OTHER REFERENCES

Article, "Electronic Shake Table," by Pierre M. Honnell, Electronics, June 1954, pages 178 and 179, Photostat in 73–71.6.

MB Vibration Notebook, July 1955, vol. 1, No. 2, 73–67.2.

MB Vibration Notebook, February 1959, vol. 5, No. 1, 73–71.6.